Patented Jan. 31, 1933

1,895,559

UNITED STATES PATENT OFFICE

FRITZ STRAUB AND HANS MAYER, OF BASEL, SWITZERLAND, ASSIGNORS TO THE FIRM OF SOCIETY OF CHEMICAL INDUSTRY IN BASLE, OF BASEL, SWITZERLAND

DYESTUFF CONTAINING METAL AND PROCESS OF MAKING SAME

No Drawing. Application filed October 3, 1929, Serial No. 397,140, and in Switzerland October 5, 1928.

The present invention relates to the manufacture of dyestuffs containing metal. It comprises the process of making these dyestuffs, the new dyestuffs themselves, and the material which has been dyed with the new dyestuffs.

By the present invention valuable products are quite generally obtained by treating, in a medium the pH of which is higher than 10, non-sulfonated azo-dyestuffs which are derived, on the one hand, from non-sulfonated aromatic diazo-compounds containing in ortho-position to the diazo-group lake forming groups, and, on the other hand, from coupling components of which the carbon atom capable of being coupled is a member of a ring system, with hydroxides of metals whose compounds may have mordanting properties, these products being metal compounds containing one or more metals. Such coupling components are for example aromatic amines, aromatic hydroxy-compounds, compounds which contain cyclic bound methylene groups capable of being coupled. In many cases this metalizing in a medium the pH of which is higher than 10, especially in a caustic alkaline medium, proceeds particularly smoothly, if instead of the metal oxide a product made by the action of the metal hydroxide in presence of caustic alkali on an organic compound containing hydroxyl is used. As organic compounds containing hydroxyl there may be used, among others, polyvalent alcohols, phenols, tannins, sugars, cellulose derivatives, lignin material. If several metals are to be introduced into the dyestuff molecule, mixtures of agents yielding metal can be used, or the metals may be introduced successively into the dyestuff molecule.

The following examples illustrate the invention, the parts being by weight:—

Example 1

31.4 parts of the dyestuff from diazotized 2:1-aminonaphthol and β-naphthol are heated in a solution of 8.7 parts of $Cr_2O_3$ in the form of a paste of chromium hydroxide in 60 parts of caustic potash during 24 hours at 74–78° C. The chromium compound is precipitated in the form of adhering cakes from the solution, and after decantation of the liquor it is pulverized, stirred up with water, filtered, washed neutral and dried. The dyestuff is somewhat soluble in caustic soda solution, completely insoluble in water and freely soluble in alcohol to a violet solution. When the blue-violet solution in Zapon varnish is applied to an aluminium sheet a violet coating of good covering power is obtained.

Example 2

26.4 parts of the dyestuff from diazotized 4-chloro-2-amino-1-phenol and resorcinol are heated in a solution of 8.4 parts of $Cr_2O_3$ in the form of a chromium hydroxide paste in 26 parts of caustic potash and 10 parts of glycerine for 16 hours in a reflux apparatus, the liquid being brought to boiling. The mixture is then diluted to 250 cc. and the chromium compound of the dyestuff is precipitated by neutralization with acetic acid; the compound is filtered, washed and dried at 50–60° C. This dyestuff is somewhat soluble in water and in caustic soda solution; also in alcohol and organic solvents, such as acetic ester, amyl acetate. A solution of it in Zapon varnish yields on metal sheet brownish-red coatings of very good fastness to light.

Example 3

5.48 parts of the dyestuff from diazotized 4-nitro-2-amino-1-phenol and resorcinal are boiled in 500 parts of water and 20 parts of ammonia of 24 per cent. strength, and then boiled in a reflux apparatus for some time with an ammoniacal solution of zinc oxide corresponding in quantity with 1.43 parts of zinc; the dyestuff which has separated is filtered, washed and dried.

Example 4

5.27 parts of the dyestuff from 4-chloro-2-amino-1-phenol and resorcinol are dissolved in 400 parts of water and 10 parts of caustic soda solution of 36° Bé and mixed, boiling hot, with a solution of 3.5 parts of iron chloride in 50 parts of water, 20 parts of caustic soda solution of 36° Bé and 7 parts of glycerine. The boiling is continued for 3 hours in a reflux apparatus. After cooling, the dyestuff is separated by addition of acetic acid, washed neutral and dried at 50–60° C. The dyestuff thus obtained is a black brown powder, sparingly soluble in water, and soluble in caustic soda solution to an olive brown solution and in concentrated sulfuric acid to a yellow brown solution. A solution of it in Zapon varnish yields on aluminium sheet brown coatings of good fastness to light. If the dyestuff from diazotized 6-nitro-4-chloro-2-amino-1-phenol and β-naphthylamine is used and instead of the iron chloride cobaltous chloride, there is obtained a green black powder which dissolves not at all or very sparingly in water or caustic soda solution but dissolves in concentrated sulfuric acid to a violet solution. On the other hand, the dyestuff dissolves freely in Zapon varnish, which then yields on aluminium sheet dull blue green, in deep tints pure green black coatings of very good fastness to light.

Example 5

5.48 parts of the dyestuff from diazotized 4-nitro-2-amino-1-phenol and resorcinol are dissolved in 400 parts of water and 10 parts of caustic soda solution of 36° Bé and the solution is heated to boiling for 3 hours in a reflux apparatus with a quantity of tin in the form of sodium stannate corresponding with 10 per cent. excess over the theoretical requirement. The whole is cooled, stirred and the tin compound is separated by means of acetic acid. After drying, it is a brown yellow powder, soluble in water and caustic soda solution to a brown-red solution and in concentrated sulfuric acid to a brown yellow solution. A solution of it in Zapon varnish yields yellow coatings on aluminium sheet which are of good fastness to light.

Example 6

5.82 parts of the dyestuff from diazotized anthralic acid and β-naphthylamine are dissolved in 500 parts of water and the solution is heated to boiling for some time in a reflux apparatus with a solution of zinc sulfate in excess of caustic soda solution corresponding with 1.43 parts of zinc. The whole is allowed to cool and the zinc compound produced is precipitated by acidifying with acetic acid. It is filtered, washed neutral and dried at a moderate temperature. The dyestuff thus obtained is a red brown powder which dissolves in water and caustic soda solution to a brown yellow solution and in concentrated sulfuric acid to a violet solution. In Zapon varnish and similar products it is freely soluble and yields powerful yellowish orange lakes.

Example 7

6.56 parts of the dyestuff from diazotized 4-chloro-2-amino-1-phenol and 1-phenyl-3-methyl-5-pyrazolone are boiled in 500 parts of water and 10 parts of caustic soda solution of 36° Bé. and the whole is mixed with an alkaline solution containing glycerine of 80 per cent. of the theoretical amount of aluminium and 20 per cent. of the theoretical amount of cobalt. Boiling is continued for 3 hours and after cooling the whole is acidified with acetic acid. The separated metal compound is filtered, washed neutral and dried at a moderate temperature. The aluminium-cobalt complex compound thus obtained is very sparingly soluble in water but dissolves in caustic soda solution to a yellow brown solution and in concentrated sulfuric acid to an orange solution. It dissolves freely in organic solvents, such as amyl acetate, acetic ester or the like. Also in solutions of Zapon varnish, which latter solutions yield on aluminium sheet vivid orange coatings of good fastness to light. The pure cobalt lake dyes redder tints and the pure aluminium lake yellower tints.

Starting with the dyestuff from diazotized 2-amino-1-phenol and β-naphthylamine and using pastes of iron and nickel hydroxide in presence of alkalies and glycerine there are obtained products which are soluble in water and caustic soda solution very sparingly and in concentrated sulfuric acid freely to a red violet solution. The solution in Zapon varnish yields coatings on aluminium sheet which are reddish brown and of good fastness to light.

Example 8

5.48 parts of the dyestuff from diazotized 4-nitro-2-amino-1-phenol and resorcinol are dissolved in 400 parts of water and 10 parts of caustic soda solution of 36° Bé and there are added to the boiling solution a solution, containing glycerine and an excess of caustic soda solution, of 1 part of ferric chloride, 1.9 parts of aluminium sulfate and 1 part of crystallized copper sulfate in 50 parts of water. After boiling for 3 hours the whole is stirred cold and then made feebly acid with acetic acid and filtered. The matter on the filter is washed neutral with water and dried at 50–60° C. When dry the metal compound thus obtained is a dark brown powder, which dissolves in water sparingly to a brown solution, in caustic soda solution to a yellow brown solution and in concentrated sulfuric acid to a brownish yellow solution. It is freely soluble in organic solvents and a solution in the usual commercial Zapon varnish yields on aluminium sheet brown, strong coatings of very powerful fastness to light.

Example 9

4–5 parts of the cobalt compound of the dyestuff from 4-chloro-2-amino-1-phenol and β-naphthol are dissolved in 1000 parts of a finished Zapon varnish. The liquid thus obtained applied in a thin layer to various surfaces (metal, glass, wood, leather, celluloid, silk or the like) yields on drying a transparent coating of wine red tint. By incorporating suitable additions with transparent varnish, the latter can be converted into a matt varnish or a covering varnish.

According to the methods explained in the examples for making metal compounds, the combinations set forth in the following table and the products yielded by the components stated may be converted among others into metal compounds.

alkali containing glycerine and corresponding with 1–3 parts of nickel; the whole is now boiled for 3 hours in a reflux apparatus. After cooling, the mass is neutralized with acetic acid, the precipitated nickel compound of the dyestuff is filtered, washed and dried at a moderate temperature. The dyestuff is a dark brown powder which is somewhat sparingly soluble in water to a brownish red solution, more freely soluble in sodium carbonate or caustic soda solution to a brown red solution and soluble in concentrated sulfuric acid to a red-violet solution. In an acetic acid bath the dyestuff dyes silk brownish red tints. The solution of the dyestuff in Zapon varnish is brownish red.

| No. | Azo-components | Coupling components | Metal | Color of lakes |
|---|---|---|---|---|
| 1 | 4-nitro-2-amino-1-phenol | Resorcinol | Lead | Yellow |
| 2 | 2-amino-1-phenol | do | Nickel | Orange |
| 3 | 4-sulfamido-2-amino-1-phenol | $\beta$-naphthol | Cobalt | Red-violet |
| 4 | 5-nitro-2-amino-1-phenol | do | Manganese | Brown-violet |
| 5 | 4-nitro-2-amino-1-phenol | 1-phenyl-3-methyl-5-pyrazolone | Iron | Brown-yellow |
| 6 | 4-chloro-2-amino-1-phenol | $\beta$-naphthylamine | Cobalt | Violet-black |
| 7 | do | Resorcinol | Tin | Reddish-yellow |
| 8 | 2-amino-1-phenol | $\beta$-naphthol | Aluminium | Reddish-orange |
| 9 | 1-amino-2-hydroxy-naphthalene | $\alpha$-naphthol | Zinc | Blue-red |
| 10 | 6-nitro-4-chloro-2-amino-1-phenol | $\beta$-naphthylamine | Cobalt | Green-black |
| 11 | 2-amino-1-hydroxy-naphthalene | 1-(ortho'-chloro-phenyl)-3-methyl-5-pyrazolone | Aluminium | Blue-red |
| 12 | 4-chloro-2-amino-1-phenol | 1-4'-sulfamido-phenyl-3-methyl-5-pyrazolone | 50% zinc 50% tin | Reddish-yellow |
| 13 | 2-amino-1-phenol | $\beta$-naphthol | 50% iron 50% nickel | Red-brown |
| 14 | 4-chloro-2-amino-1-phenol | Resorcinol | 20% nickel 80% copper | Orange |
| 15 | 2-amino-1-phenol | $\beta$-naphthylamine | 50% iron 50% tin | Brown-red |
| 16 | 4-sulfamido-2-amino-1-phenol | $\beta$-naphthol | 50% iron 50% manganese | Brown |
| 17 | 2-amino-1-phenol | $\beta$-naphthol | 30% iron 70% aluminium | Reddish-brown |
| 18 | 4-chloro-2-amino-1-phenol | 1-phenyl-3-methyl-5-pyrazolone | 60% aluminium 40% copper | Brownish-yellow |
| 19 | do | $\beta$-naphthylamine | 80% iron 20% cobalt | Blue-black |
| 20 | 4-sulfamido-2-amino-1-phenol | $\beta$-naphthol | 50% cobalt 50% aluminium | Red-violet |
| 21 | 4-chloro-2-amino-1-phenol | Resorcinol | 60% cobalt 40% copper | Bordeaux-red |
| 22 | 5-nitro-2-amino-1-phenol | $\beta$-naphthol | 20% aluminium 30% copper 50% cobalt | Blue-violet |

*Example 10*

7.29 parts of the sodium salt of the azo-dyestuff from 4-chloro-2-amino-1-phenol and 2:3-hydroxynaphthoic acid are introduced into a caustic alkali chromium solution (chromite solution) consisting of 60 parts of solid caustic potash, 450 parts of water and 15.2 parts of $Cr_2O_3$ in the form of a hydrate paste of 24 per cent. strength, and while stirring well the mixture is heated until the chromium compound of the dyestuff has been formed. The mixture is then filtered and the chromium compound precipitated by neutralizing the alkaline solution and salting out. It is a blackish powder which dissolves in water to a violet solution and in dilute caustic soda solution to a reddish violet solution and dyes wool in an acid bath fast violet tints. Zapon varnish is also dyed violet tints.

*Example 11*

6.86 parts of the dyestuff from diazotized 2-amino-1-phenol-4-sulfamide and $\beta$-naphthol are dissolved in 500 parts of water and 5 parts of caustic soda solution of 36° Bé, and the solution is mixed, while boiling, with a suspension of nickel hydroxide in caustic

*Example 12*

5.92 parts of the dyestuff from diazotized 4-chloro-2-amino-1-phenol and $\beta$-naphthol are boiled up in 500 parts of water and 20 parts of caustic soda solution, and boiled for some time in a reflux condenser with a quantity of a solution of sodium ferrate corresponding to 1.23 parts of iron made by precipitating ferric chloride with caustic soda solution in the presence of glycerine. The product of the reaction is then precipitated by acidifying with acetic acid, filtered, washed, and dried. It constitutes a black powder which dissolves in water and dilute caustic soda solution with difficulty to a brown-violet solution, and in concentrated sulfuric acid to a red-violet solution. In Zapon varnishes and similar products it dissolves easily with deep brown color, and yields yellowish brown films which, in their deeper shades, are brownish black.

What we claim is:—

1. As new products the metal compounds

1. As new products the metal compounds of non-sulfonated azo-dyestuffs deriving from non-sulfonated aromatic diazo-compounds containing in o-position to the diazo-group lake forming groups, and such coupling components which contain at the most one carboxyl group and of which the carbon atom capable of being coupled is a member of a ring system, which metal compounds are obtained by treating these non-sulfonated azo-dyestuffs in a medium the pH of which is higher than 10, with agents yielding metals capable of forming lakes, and which products, when dry, form dark powders, soluble in many organic solvents and in the usual commercial pyroxyline varnishes with various colors.

2. As new products the metal compounds of non-sulfonated azo-dyestuffs deriving from non-sulfonated aromatic diazo-compounds containing in o-position to the diazo-group lake forming groups, and such coupling components which contain at the most one carboxyl group and of which the carbon atom capable of being coupled is a member of a ring system, which metal compounds are obtained by treating these non-sulfonated azo-dyestuffs in a caustic alkaline medium, in presence of organic compounds containing hydroxyl-groups, with agents yielding metals capable of forming lakes, and which products, when dry, form dark powders, soluble in many organic solvents and in the usual commercial pyroxyline varnishes with various colors.

3. As new products the metal compounds of non-sulfonated o-hydroxy-azo-dyestuffs deriving from non-sulfonated aromatic o-hydroxy-diazo-compounds and such coupling components which contain at the most one carboxyl group and of which the carbon atom capable of being coupled is a member of a ring system, which metal compounds are obtained by treating these non-sulfonated azo-dyestuffs in a caustic alkaline medium, in presence of organic compounds containing hydroxyl-groups, with agents yielding metals of the atomic weight 27.1 to 65.4, which products, when dry, form dark powders, soluble in many organic solvents and in the usual commercial pyroxyline varnishes with various colors.

4. As new products the metal compounds of non-sulfonated o-hydroxy-azo-dyestuffs deriving from non-sulfonated aromatic o-hydroxy-diazo-compounds and such coupling components which contain at the most one carboxyl group and of which the carbon atom capable of being coupled is a member of a ring system, which metal compounds are obtained by treating these non-sulfonated azo-dyestuffs in a caustic alkaline medium, in the presence of organic compounds containing hydroxyl-groups, with agents yielding metals of the atomic weight 52.1 to 65.4, which products, when dry, form dark powders, soluble in many organic solvents and in the usual commercial pyroxyline varnishes with various colors.

5. As new products the metal compounds of non-sulfonated o-hydroxy-azo-dyestuffs deriving from non-sulfonated aromatic o-hydroxy-diazo-compounds and such coupling components which contain at the most one carboxyl group and of which the carbon atom capable of being coupled is a member of a ring system, which metal compounds are obtained by treating these non-sulfonated azo-dyestuffs in a caustic alkaline medium, in presence of organic compounds containing hydroxyl-groups, with agents yielding metals of the atomic weight 55 to 58.7, which products, when dry, form dark powders, soluble in many organic solvents and in the usual commercial pyroxyline varnishes with various colors.

6. As new products the metal compounds of non-sulfonated o-hydroxy-azo-dyestuffs deriving from non-sulfonated aromatic o-hydroxy-diazo-compounds and such coupling components which contain at the most one carboxyl group and of which the carbon atom capable of being coupled is a member of a ring system, which metal compounds are obtained by treating these non-sulfonated azo-dyestuffs in a caustic alkaline medium, in presence of polyvalent alcohols, with agents yielding metals of the atomic weight 55 to 58.7, which products, when dry, form dark powders, soluble in many organic solvents and in the usual commercial pyroxyline varnishes with various colors.

7. As new products the metal compounds of non-sulfonated o-hydroxy-azo-dyestuffs deriving from non-sulfonated aromatic o-hydroxy-diazo-compounds and such hydroxy-naphthalenes which contain at the most one carboxyl group and, which metal compounds are obtained by treating these non-sulfonated azo-dyestuffs in a caustic alkaline medium, in presence of polyvalent alcohols, with agents yielding metals of the atomic weight 55 to 58.7, which products, when dry, form dark powders, soluble in many organic solvents and in the usual commercial pyroxyline varnishes with various colors.

8. As new products the metal compounds of non-sulfonated o-hydroxy-azo-dyestuffs deriving from non-sulfonated o-hydroxy-diazo-benzenes and such hydroxynaphthalenes which contain at the most one carboxyl group and, which metal compounds are obtained by treating these non-sulfonated azo-dyestuffs in a caustic alkaline medium, in presence of polyvalent alcohols, with agents yielding metals of the atomic weight 55 to 58.7, which products, when dry, form dark powders, soluble in many organic solvents and in the usual commercial pyroxyline varnishes with various colors.

9. As a new product the metal compound of a non-sulfonated o-hydroxy-azo-dyestuff of the formula

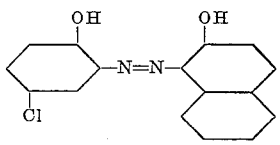

which metal compound is obtained by treating this non-sulfonated azo-dyestuff in a caustic alkaline medium, in presence of glycerine, with an agent yielding iron, which product, when dry, forms a dark powder, soluble in alcohol and in the usual commercial pyroxyline varnishes with black color.

In witness whereof we have hereunto signed our name this 21st day of September, 1929.

FRITZ STRAUB.
HANS MAYER.